(12) United States Patent
Ozbilgin et al.

(10) Patent No.: US 10,848,718 B2
(45) Date of Patent: Nov. 24, 2020

(54) VEHICLE SENSOR CONFIGURATION BASED ON MAP DATA

(71) Applicant: Aptiv Technologies Limited, St. Michael (BB)

(72) Inventors: Guchan Ozbilgin, Pittsburgh, PA (US); Wenda Xu, Pittsburgh, PA (US); Jarrod M. Snider, Clairton, PA (US); Yimu Wang, Pittsburgh, PA (US); Yifan Yang, Pittsburgh, PA (US); Junqing Wei, Bridgeville, PA (US)

(73) Assignee: Aptiv Technologies Limited, St. Michael (BB)

( * ) Notice: Subject to any disclaimer, the term of this patent is extended or adjusted under 35 U.S.C. 154(b) by 259 days.

(21) Appl. No.: 15/920,946

(22) Filed: Mar. 14, 2018

(65) Prior Publication Data

US 2019/0281260 A1    Sep. 12, 2019

Related U.S. Application Data

(60) Provisional application No. 62/640,316, filed on Mar. 8, 2018.

(51) Int. Cl.
| | |
|---|---|
| *H04N 7/18* | (2006.01) |
| *G01S 13/89* | (2006.01) |
| *G01S 17/89* | (2020.01) |
| *G01S 17/931* | (2020.01) |
| *G01S 13/931* | (2020.01) |

(52) U.S. Cl.
CPC ............. *H04N 7/185* (2013.01); *G01S 13/89* (2013.01); *G01S 17/89* (2013.01); *G01S 13/931* (2013.01); *G01S 17/931* (2020.01); *G01S 2013/9322* (2020.01)

(58) Field of Classification Search
CPC ........ G01S 13/86; G01S 13/89; G01S 13/931; G01S 15/931; G01S 17/86
See application file for complete search history.

(56) References Cited

U.S. PATENT DOCUMENTS

| | | | |
|---|---|---|---|
| 6,055,042 A * | 4/2000 | Sarangapani | G01S 13/931 356/4.01 |
| 2003/0093220 A1 | 5/2003 | Andersson et al. | |
| 2004/0267452 A1 | 12/2004 | Igarashi et al. | |
| 2006/0137483 A1 | 6/2006 | Zimmermann et al. | |
| 2010/0007476 A1 | 1/2010 | Klotz et al. | |

(Continued)

OTHER PUBLICATIONS

Danish Search Opinion in Danish Application No. PA201870731, dated Jan. 17, 2019, 6 pages.

*Primary Examiner* — Michael J Dalbo
(74) *Attorney, Agent, or Firm* — Fish & Richardson P.C.

(57) ABSTRACT

A vehicle perception sensor adjustment system includes a perception-sensor, a digital-map, and controller-circuit. The perception-sensor is configured to detect an object proximate to a host-vehicle. The perception-sensor is characterized as having a field-of-view that is adjustable. The digital-map indicates a contour of a roadway traveled by the host-vehicle. The controller-circuit in communication with the perception-sensor and the digital-map. The controller-circuit determines the field-of-view of the perception-sensor in accordance with the contour of the roadway indicated by the digital-map, and outputs a control-signal to the perception-sensor that adjusts the field-of-view of the perception-sensor.

19 Claims, 3 Drawing Sheets

(56) References Cited

U.S. PATENT DOCUMENTS

2016/0003938 A1* 1/2016 Gazit ............... G01S 13/02
                                                    342/81
2017/0254880 A1* 9/2017 Smith ............... G01S 13/86

* cited by examiner

US 10,848,718 B2

VEHICLE SENSOR CONFIGURATION BASED ON MAP DATA

TECHNICAL FIELD OF INVENTION

This disclosure generally relates to a vehicle perception sensor adjustment system, and more particularly relates to a system that determines the field-of-view of the perception-sensor in accordance with a contour of the roadway indicated by the digital-map.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
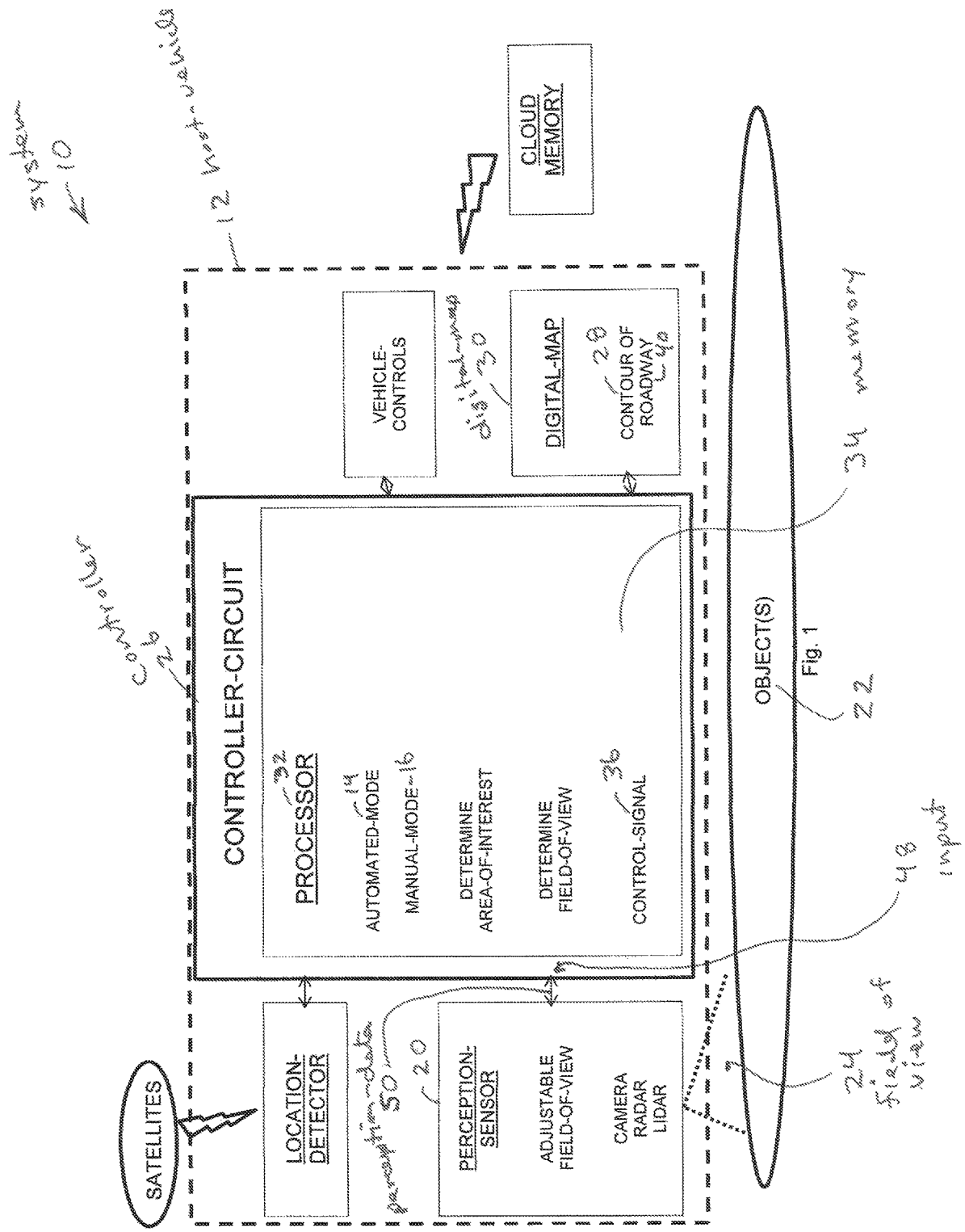
FIG. 1 is a diagram of a vehicle perception sensor adjustment system in accordance with one embodiment.

FIG. 1 illustrates a non-limiting example of a vehicle perception sensor adjustment system 10, hereafter the system 10, that is generally suitable to be installed on an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object such as an other-vehicle, a pedestrian, or a road sign.

The system 10 includes a perception-sensor 20 configured to detect one or more instances of an object 22 (e.g. other-vehicle, stationary-object, ground-surface) proximate to (e.g. within 100 m) the host-vehicle 12. The perception-sensor 20 may include or consist of one or more instances of a camera (visible and/or infrared light), radar-unit, a lidar-unit, or any combination thereof. The sensors that make up the perception-sensor 20 may be arranged in a unified housing, or distributed about the host-vehicle. For example, there may be multiple cameras mounted at distributed locations about the host-vehicle so a 360° panoramic image of the area about the host-vehicle 12 can be synthesized.

The perception-sensor 20 is characterized as having a field-of-view 24 that is adjustable, i.e. variable so as to be able to exclude portions of the maximum-field-of-view of the perception-sensor 20. That is, the camera, radar-unit, and/or lidar-unit can be individually or group-wise reconfigured to capture perception-data (image from camera, radar-map from radar-unit, point-cloud from lidar) from less than the maximum-filed-of-view of at least one, but possible all, of the sensors (camera, radar-unit, lidar-unit) that make up or form the perception-sensor 20. An advantage of adjusting (i.e. decreasing) the field-of-view 24 of the perception-sensor 20 is that less data is communicated out of the perception-sensor 20 to, for example, a controller-circuit 26. In contrast, a system that operates its sensors at the maximum-field-of-view and then relies on data-processing to sort out which of the received perception-data is of interest wastes processing resources because some of the perception-data communicated out of the perception-sensor is just ignored, i.e. disposed of. So, rather than unnecessarily operating the perception-sensor only at the maximum-field-of-view and then ignoring some of the perception-data, the system 10 described herein reduces the field-of-view 24 of the perception-sensor 20 so that unnecessary perception-data is not collected or communicated out of the perception-sensor 20.

The system 10 is distinct from prior systems because the system 10 adjusts the field-of-view 24 of the perception-sensor 20 to exclude, block out, or ignore data from a portion of the maximum-field-of-view of the perception-sensor 20 based on or in accordance with the curvature or contour 28 (e.g. vertical-curvature and/or lateral curvature) of the upcoming roadway. For the system 10 to have knowledge of the contour 28, the system 10 includes a digital-map 30 that indicates the contour 28 of a roadway traveled by the host-vehicle 12. The digital-map 30 may be partially or entirely stored on-board the host-vehicle and/or partially or entirely stored in the cloud. The system 10 may determine the present location (i.e. coordinates) of the host-vehicle 12 on the digital-map 30 based on information from a location-detector, e.g. a global-position-system receiver (GPS receiver) or a landmark-identification-system. The digital-map 30 may be a three-dimensional (3-D) model of the roadway, or a two-dimensional map with additional information regarding elevation changes of the roadway.

As mentioned above, the system 10 includes a controller-circuit 26, hereafter sometimes referred to as the controller 26, that is in communication with the perception-sensor 20 and the digital-map 30. The controller-circuit 26, hereafter sometimes referred to as the controller 26, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 26, it is recognized that the functions of the controller 26 may be shared or distributed among several instances of controllers that are configured for some specific task. Hereafter, any reference to the controller 26 being configured for something is to also be interpreted as suggesting that the processor 32 may also be configured for the same thing. The controller 26 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 26, or separate from the controller 26 such as remote memory stored in the cloud. The one or more routines may be executed by the controller 26 or the processor 32 to perform steps for determining a preferred configuration or size of the field-of-view 24 of the perception-sensor 20 based on information received by the controller 26 from the digital-map 30 as described herein.

The controller-circuit 26 determines the field-of-view 24 of the perception-sensor 20 in accordance with the contour 28 of the roadway indicated by the digital-map 30, and then outputs a control-signal 36 to the perception-sensor 20 that adjusts the field-of-view 24 of the perception-sensor 20. The adjustment of the field-of-view 24 may include, but is not limited to, reducing the field-of-view 24 laterally to exclude, for example, a left-portion and/or a right-portion of the maximum-field-of-view, and/or reducing the field-of-view 24 vertically to exclude, for example, an upper-portion and/or a lower-portion of the maximum-field-of-view. It is also recognized that the field-of-view 24 of sensors that readily determine a range or distance to an object, e.g. a radar-unit or a lidar-unit, can also be configured or adjusted to ignore or exclude objects detected further away or closer than some distance-threshold.

Figure 2:
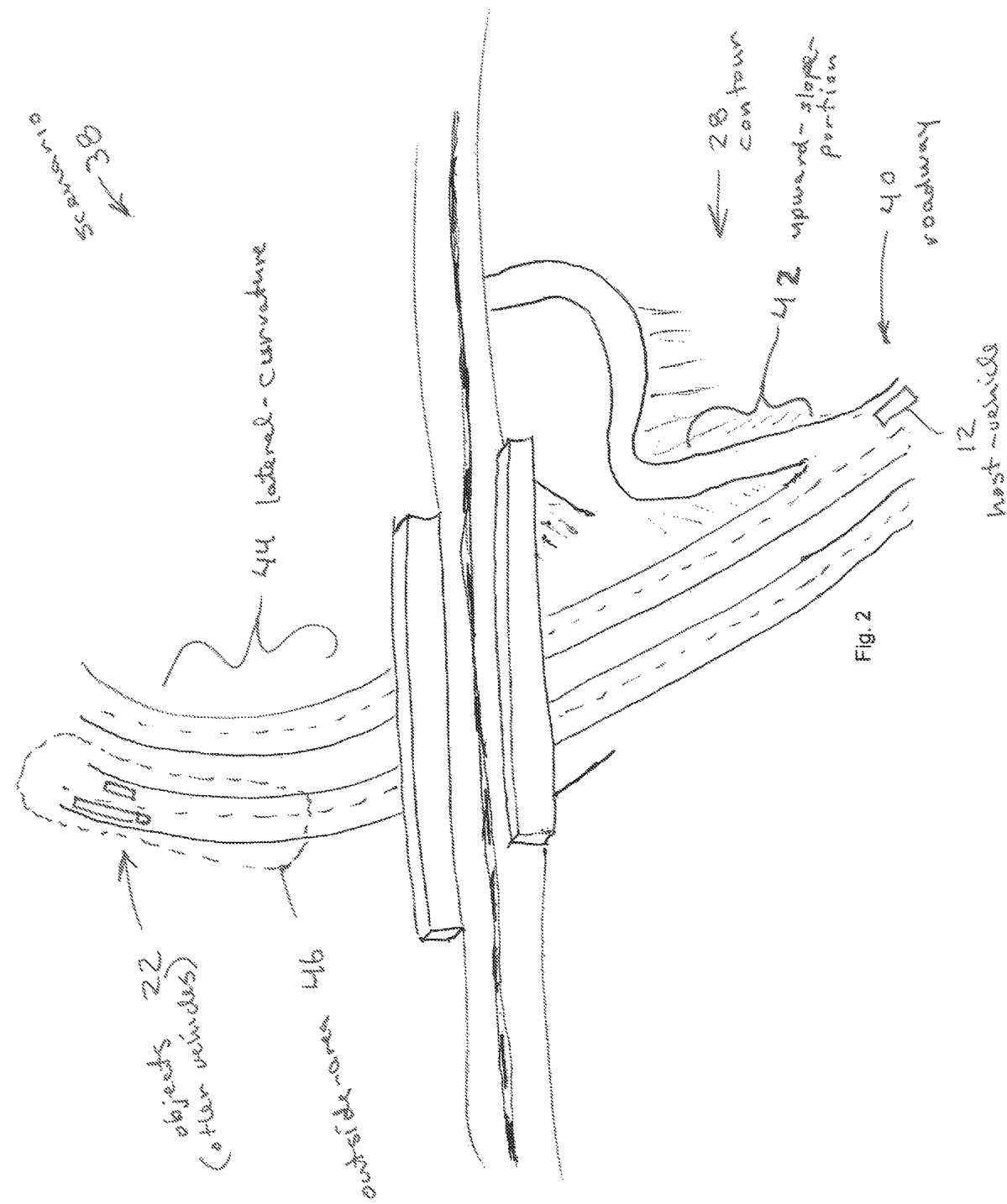
FIG. 2 is a scenario encountered by the system of FIG. 1 in accordance with one embodiment.

FIG. 2 illustrates a non-limiting example of a scenario 38 where the contour 28 of the roadway 40 includes an upward-slope-portion 42 of the roadway 40 ahead of the host-vehicle 12. It has been observed that some configurations of the perception-sensor 20 may see or interpret a sudden upward sloping roadway as a barrier or obstructing object rather than ground upon which the host-vehicle 12 could travel, which could cause an unnecessary response by the system 10 such as operating the vehicle-controls of the host-vehicle 12 to unnecessarily reduce speed. However, since the system 10 has knowledge of the presence of the upward-slope-portion 42 because of the indication of the contour 28 indicated by the digital-map 30, and the controller 26 adjusts the field-of-view 24 of the perception-sensor 20 to exclude the upward-slope-portion 42 of the roadway 40. As the host-vehicle 12 begins to travel up the upward-slope-portion 42, the angle of the perception-sensor 20 is pointed upward (relative to earth level), so the controller 26 may reset the perception-sensor 20 to the maximum-field-of-view so any instances of the objects 22 can be detected.

By way of further non-limiting example, FIG. 2 illustrates that the contour 28 of the roadway 40 includes a lateral-curvature 44 of the roadway 40 ahead of the host-vehicle 12. The presence of the lateral-curvature 44 causes instances of objects 22 such as approaching vehicles to appear to the perception-sensor 20 to be straight ahead of the host-vehicle 12. However, since the system 10 has knowledge of the presence of the lateral-curvature 44 because of the indication of the contour 28 indicated by the digital-map 30, the controller 26 can adjust the field-of-view 24 of the perception-sensor 20 to exclude an outside-area 46 characterized as outside of the lateral-curvature 44 of the roadway 40. That is, the perception-sensor 20 can be adjusted or configured to ignore the approaching vehicles by ignoring objects that are not actually on the travel-lane of the host-vehicle 12.

Returning to FIG. 1, the controller 26, or the processor 32, includes an input 48 that receives perception-data 50 from the perception-sensor 20. The input 48 may be a wireless receiver or a digital type input suitable for a wired connection. The perception-data 50 may include, but is not limited to, raw-data such as images or a video stream from a camera, a radar-map from a radar-unit, and/or a point-cloud from a lidar-unit. Alternatively, the perception-sensor 20 may be equipped to perform some signal processing to perform object detection/classification/tracking of the objects 22 present in the field-of-view 24.

Figure 3:
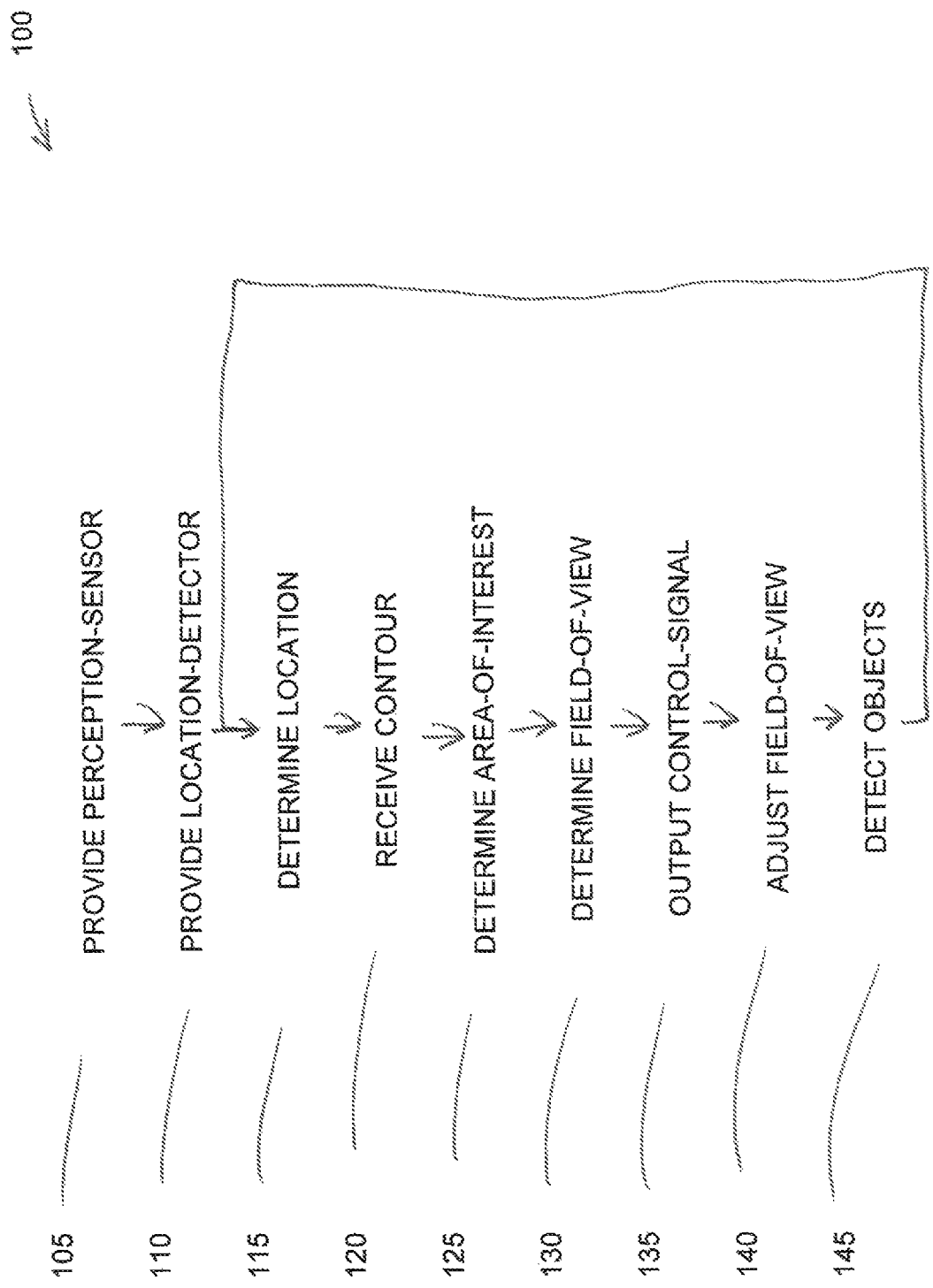
FIG. 3 is method of operating the system of FIG. 1 in accordance with one embodiment.

FIG. 3 illustrates a non-limiting example of a method 100 of operating a vehicle perception sensor adjustment system 10.

Step 105, PROVIDE PERCEPTION-SENSOR, may include providing a perception-sensor 20 to be installed on a host-vehicle 12. The perception-sensor 20 is generally configured to detect one or more instances of objects 22 proximate to (e.g. within 200 meters) the host-vehicle 12. The perception-sensor 20 is characterized as having a field-of-view 24 that is adjustable.

Step 110, PROVIDE LOCATION-DETECTOR, may include providing and/or installing a global-position-system (GPS) receiver on the host-vehicle 12 that outputs coordinate of the GPS receiver based on signals received from satellites.

Step 115, DETERMINE LOCATION, may include receiving coordinates from the location-detector and determining a point on the digital-map 30 that corresponds to the coordinates from the location-detector. Determining the location may also include determining a heading (e.g. compass-direction and present-speed) of the host-vehicle 12.

Step 120, RECEIVE CONTOUR, may include receiving, from the digital-map 30, information that describes or corresponds to the contour 28 (i.e. shape, vertical and/or horizontal curvature) of the roadway 40 (i.e. travel-lane) traveled by the host-vehicle 12.

Step 125, DETERMINE AREA-OF-INTEREST, may include determining a travel-path that the host-vehicle 12 will travel in the next time-interval, e.g. in the next fifteen seconds (15 s) so that the field-of-view 24 can be determined.

Step 130, DETERMINE FIELD-OF-VIEW, may include determining the field-of-view 24 of a perception-sensor 20 in accordance with the contour 28 of the roadway 40 indicated by the digital-map 30 that will be soon traveled by the host-vehicle 12. The field-of-view 24 is selected or determined so that the perception-data 50 collected by the perception-sensor 20 does not include information or data that is not relevant to the operation (automated-mode or manual-mode) of the host-vehicle 12. For example, the contour 28 of the roadway 40 may indicate that there is an upward-slope-portion 42 (FIG. 2) of the roadway ahead of the host-vehicle 12 that will be traveled by the host-vehicle 12. To avoid a false-positive detection of an object, e.g. a false detection of an apparent barrier, the field-of-view 24 is configured to exclude the upward-slope-portion 42 of the roadway 40. By way of another non-limiting example, determining the field-of-view 24 may include excluding an outside-area 46 of the roadway 40 in response to a determination that the contour 28 of the roadway 40 indicates a lateral-curvature 44 of the roadway 40 ahead of the host-vehicle 12.

Step 135, OUTPUT CONTROL-SIGNAL, may include outputting a control-signal 36 to the perception-sensor 20 from the controller 26 or the processor 32. The control-signal 36 adjusts the field-of-view 24 of the perception-sensor 20

Step 140, ADJUST FIELD-OF-VIEW, may include the camera ignoring a portion of a captured image, i.e. sending only a portion of the entire image captured by the camera to the controller 26 or the processor 32. Alternatively, adjusting the field-of-view of the radar-unit or the lidar-unit may include setting a distance limit so that any instances of the objects 22 that are beyond a distance-threshold are ignored.

Step 145, DETECT OBJECTS, may include the controller 26 or the processor 32 processing the perception-data 50 from the perception-sensor 20 to identify, classify, and/or track instances of the objects 22 that are present within the field-of-view 24 of the perception-sensor 20.

Described herein is a first device 26 that includes one or more processors 32; memory 34; and one or more programs 100 stored in the memory 34. Also, described herein is a non-transitory computer-readable storage-medium 34 that includes one or more programs 100 for execution by one or more processors 32 of a first device 26. The one or more programs 100 including instructions which may be executed by the one or more processors 32.

Accordingly, a vehicle perception sensor adjustment system (the system 10), a controller 26 and a processor 32 for the system 10, and a method 100 of operating the system 10 are provided. The field-of-view 24 of the perception-sensor 20 is dynamically adjusted in accordance with the contour 28 of the roadway 40 that the host-vehicle 12 is about to travel. The contour 28 is retrieved from a digital-map. By adjusting the field-of-view 24, the amount of the perception-data 50 sent to the controller 26 is reduced, and instances of objects 22 that are not relevant to operating the host-vehicle 12 are ignored.

While this invention has been described in terms of the preferred embodiments thereof, it is not intended to be so limited, but rather only to the extent set forth in the claims that follow.

We claim:

1. A vehicle perception sensor adjustment system, the system comprising:
    a perception-sensor configured to detect an object proximate to a host-vehicle, wherein the perception-sensor is characterized as having a field-of-view that is adjustable;
    a digital-map that indicates a contour of a roadway traveled by the host-vehicle; and
    a controller-circuit in communication with the perception-sensor and the digital-map, the controller-circuit configured for:
        determining a travel path of the host-vehicle,
        determining the field-of-view of the perception-sensor in accordance with the contour of the roadway indicated by the digital-map and the travel path of the host-vehicle,
        outputting a first control-signal to the perception-sensor, wherein the first control-signal adjusts the field-of-view of the perception-sensor to exclude a portion of the roadway ahead of the host-vehicle,
        determining that the host-vehicle has traversed the excluded portion of the roadway, and
        upon the determination, outputting a second control-signal to the perception-sensor, wherein the second control-signal readjusts the field-of-view of the perception-sensor to a maximum-field-of-view.

2. The system in accordance with claim 1, wherein the portion of the roadway ahead of the host-vehicle includes an upward-slope-portion of the roadway, and the controller adjusts the field-of-view of the perception-sensor to exclude the upward-slope-portion of the roadway.

3. The system in accordance with claim 1, wherein the portion of the roadway ahead of the host-vehicle includes a lateral-curvature of the roadway, and the controller adjusts the field-of-view of the perception-sensor to exclude an outside-area characterized as outside of the lateral-curvature of the roadway.

4. The system in accordance with claim 1, wherein the controller-circuit further determines a heading of the host-vehicle, and wherein the field-of-view of the perception-sensor is determined further in accordance with the heading of the host-vehicle.

5. The system in accordance with claim 1, wherein adjusting the field-of-view of the perception-sensor comprises reconfiguring the perception-sensor to capture perception-data from less than the maximum field-of-view.

6. The system in accordance with claim 1, wherein the perception-sensor includes one or more of a camera, a radar unit, or a LIDAR unit, and wherein adjusting the field-of-view of the perception-sensor comprises reconfiguring one or more of the camera, the radar unit, or the LIDAR unit to capture perception-data from less than the maximum field-of-view.

7. The system in accordance with claim 6, wherein the perception-data comprises one or more of an image from the camera, a radar map from the radar unit, or a point cloud from the LIDAR unit.

8. The system in accordance with claim 1, wherein adjusting the field-of-view of the perception-sensor to exclude a portion of the roadway ahead of the host-vehicle comprises one or more of:
reducing the field-of-view laterally to exclude one or more of a left-portion or a right-portion of the maximum-field-of-view, or
reducing the field-of-view vertically to exclude one or more of an upper-portion, or
a lower-portion of the maximum-field-of-view.

9. A controller for a vehicle perception sensor adjustment system, said controller comprising:
an input that receives perception-data from a perception-sensor configured to detect an object proximate to a host-vehicle, wherein the perception-sensor is characterized as having a field-of-view that is adjustable;
a digital-map that indicates a contour of a roadway traveled by the host-vehicle; and
a processor in communication with the perception-sensor and the digital-map, wherein the processor is configured for:
determining a travel path of the host-vehicle;
determining the field-of-view of the perception-sensor in accordance with the contour of the roadway indicated by the digital-map and the travel path of the host-vehicle,
outputting a first control-signal to the perception-sensor, wherein the first control-signal adjusts the field-of-view of the perception-sensor to exclude a portion of the roadway ahead of the host-vehicle,
determining that the host-vehicle has traversed the excluded portion of the roadway, and
upon the determination, outputting a second control-signal to the perception-sensor, wherein the second control-signal readjusts the field-of-view of the perception-sensor to a maximum-field-of-view.

10. The controller in accordance with claim 9, wherein the portion of the roadway ahead of the host-vehicle includes an upward-slope-portion of the roadway, and the processor adjusts the field-of-view of the perception-sensor to exclude the upward-slope-portion of the roadway.

11. The controller in accordance with claim 9, wherein the portion of the roadway ahead of the host-vehicle includes a lateral-curvature of the roadway, and the processor adjusts the field-of-view of the perception-sensor to exclude an outside-area characterized as outside of the lateral-curvature of the roadway.

12. A method of operating a vehicle perception sensor adjustment system, the method comprising:
providing a perception-sensor configured to detect an object proximate to a host-vehicle, wherein the perception-sensor is characterized as having a field-of-view that is adjustable;
receiving, from a digital-map, a contour of a roadway traveled by a host-vehicle;
determining a travel path of the host-vehicle;
determining the field-of-view of a perception-sensor in accordance with the contour of the roadway indicated by the digital-map and the travel path of the host-vehicle;
outputting a first control-signal to the perception-sensor, wherein the first control-signal adjusts the field-of-view of the perception-sensor to exclude a portion of the roadway ahead of the host-vehicle;
determining that the host-vehicle has traversed the excluded portion of the roadway; and
upon the determination, outputting a second control-signal to the perception-sensor, wherein the second control-signal readjusts the field-of-view of the perception-sensor to a maximum-field-of-view.

13. The method in accordance with claim 12, wherein determining the field-of-view includes excluding an upward-slope-portion of the roadway ahead of the host-vehicle in response to a determination that the contour of the roadway indicates the upward-slope-portion of the roadway ahead of the host-vehicle.

14. The method in accordance with claim 12, wherein determining the field-of-view includes excluding an outside-area of the roadway ahead of the host-vehicle in response to a determination that the contour of the roadway indicates a lateral-curvature of the roadway ahead of the host-vehicle.

15. The method in accordance with claim 12, further comprising:
determining a heading of the host-vehicle, and wherein the field-of-view of the perception-sensor is determined further in accordance with the heading of the host-vehicle.

16. The method in accordance with claim 12, wherein adjusting the field-of-view of the perception-sensor comprises reconfiguring the perception-sensor to capture perception-data from less than the maximum field-of-view.

17. The method in accordance with claim 12, wherein the perception-sensor includes one or more of a camera, a radar unit, or a LIDAR unit, and wherein adjusting the field-of-view of the perception-sensor comprises reconfiguring one or more of the camera, the radar unit, or the LIDAR unit to capture perception-data from less than the maximum field-of-view.

18. The method in accordance with claim 17, wherein the perception-data comprises one or more of an image from the camera, a radar map from the radar unit, or a point cloud from the LIDAR unit.

19. The method in accordance with claim 12, wherein adjusting the field-of-view of the perception-sensor to exclude a portion of the roadway ahead of the host-vehicle comprises one or more of:
reducing the field-of-view laterally to exclude one or more of a left-portion or a right-portion of the maximum-field-of-view, or
reducing the field-of-view vertically to exclude one or more of an upper-portion, or
a lower-portion of the maximum-field-of-view.

* * * * *